(12) United States Patent
Wallace et al.

(10) Patent No.: US 8,538,318 B2
(45) Date of Patent: Sep. 17, 2013

(54) APPARATUS AND METHODS FOR AN INTERACTIVE ELECTRONIC BOOK SYSTEM

(75) Inventors: Michael W. Wallace, Vancouver, WA (US); Philip Trevor Odom, Portland, OR (US)

(73) Assignee: Pure Imagination, LLC, Vancouver, WA (US)

( * ) Notice: Subject to any disclaimer, the term of this patent is extended or adjusted under 35 U.S.C. 154(b) by 1019 days.

(21) Appl. No.: 12/148,962

(22) Filed: Apr. 23, 2008

(65) Prior Publication Data

US 2008/0268416 A1 Oct. 30, 2008

Related U.S. Application Data

(60) Provisional application No. 60/913,496, filed on Apr. 23, 2007.

(51) Int. Cl.
*G09B 5/00* (2006.01)

(52) U.S. Cl.
USPC .......................................... 434/317; 434/316

(58) Field of Classification Search
USPC ........ 434/308, 309, 311, 317, 319; 281/15.1, 281/27.2, 27.3
See application file for complete search history.

(56) References Cited

U.S. PATENT DOCUMENTS

| | | | | |
|---|---|---|---|---|
| 5,466,158 A | * | 11/1995 | Smith, III | 434/317 |
| 6,595,418 B1 | * | 7/2003 | Igarashi et al. | 235/385 |
| 6,655,586 B1 | * | 12/2003 | Back et al. | 235/382 |
| 6,724,198 B2 | * | 4/2004 | Hohl | 324/654 |
| 6,763,995 B1 | * | 7/2004 | Song | 235/375 |
| 7,192,628 B2 | * | 3/2007 | Burrows | 427/598 |
| 7,396,049 B2 | * | 7/2008 | Nelson et al. | 283/83 |
| 2003/0107366 A1 | * | 6/2003 | Busch et al. | 324/202 |
| 2005/0053906 A1 | * | 3/2005 | Kim et al. | 434/317 |
| 2005/0095568 A1 | * | 5/2005 | Musolf et al. | 434/308 |
| 2005/0123889 A1 | * | 6/2005 | Kim et al. | 434/317 |
| 2005/0199713 A1 | * | 9/2005 | Rathus et al. | 235/382 |
| 2005/0200116 A1 | * | 9/2005 | Chiu | 281/15.1 |
| 2005/0236489 A1 | * | 10/2005 | Droz | 235/487 |
| 2005/0246458 A1 | * | 11/2005 | Kavanagh | 710/62 |
| 2005/0258633 A1 | * | 11/2005 | Hilicki et al. | 283/63.1 |
| 2006/0025036 A1 | * | 2/2006 | Boyle et al. | 446/175 |
| 2006/0103379 A1 | * | 5/2006 | Sato | 324/244 |
| 2006/0154559 A1 | * | 7/2006 | Yoshida | 446/297 |

* cited by examiner

*Primary Examiner* — Bruk Gebremichael

(74) *Attorney, Agent, or Firm* — Rylander & Associates, PC; Philip R. M. Hunt; Kurt M. Rylander

(57) ABSTRACT

Apparatus and methods are provided relating to delivering audio content for an interactive electronic book system, including a book with a plurality of pages with overlaying magnets affixed thereto, a magnetic sensor, a temperature sensor, a speaker, a computer with calibration and temperature compensation data stored in non-volatile memory, and audio content related to the pages of the book, such that the computer determines which page the book is open to and causes the speaker to deliver audio content related to the open page. Apparatus and methods are provided for calibrating an electronic book system including temperature compensation steps.

6 Claims, 8 Drawing Sheets

APPARATUS AND METHODS FOR AN INTERACTIVE ELECTRONIC BOOK SYSTEM

CROSS-REFERENCE TO RELATED APPLICATION

This application claims priority to Provisional Application Ser. No. 60/913,496, filed Apr. 23, 2007, and which is hereby incorporated by reference into this Specification.

FIELD OF THE INVENTION

The present invention relates to audio book systems. More particularly, the present invention relates to magnetic page number readers for audio books.

BACKGROUND

This invention relates generally to apparatus and methods for talking books having entertainment and educational value, and more particularly to an interactive talking book system which produces auditory content based on the identity of the page of the book open to the reader.

A number of systems have been developed to provide supplementary audio content to a reader of a book. For example, U.S. Pat. Nos. 4,884,974 (DeSmet), 4,990,092 (Cummings), 5,453,013 (Billings et al.), 5,631,883 (Li), 5,645,432 (Jessop), 5,707,240 (Haas et al.), 6,064,855 (Ho), 6,729,543 (Arons et al.), 6,865,367 and 7,010,261 (Kim et al.), and 6,763,995 and 7,111,774 (Song), describe systems for providing audio content to a reader of a book.

Disadvantageously, some of these systems rely on manual activation by the reader to signal the identity of the open page. A young child trying to read the book alone may not be able to activate the system properly so the beneficial effect is lost. Other page-detection systems automatically detect the current page, but are either unreliable or very expensive. Optical systems using ambient light and optical detectors require adequate external illumination and are easily confused by poor lighting, misaligned pages, or holding the book improperly which blocks the receivers. Optical systems using self-contained light sources are less vulnerable to variations in ambient lighting, but are still quite vulnerable to page misalignments and improper holding, as well as imposing greater power requirements for the multiple light sources. These limitations may not be a problem when sitting in a chair at a table, but when used for bedtime reading, or in a family car, or on a plane, or at an outdoor picnic, or in any number of other situations where a child may want to read their favorite books, these limitations significantly impair the experience for the child and parent. Additionally, optical detection systems generally require individual detectors for each page, significantly increasing the cost of the books.

Existing systems teaching the use of magnetic sensors do not address the problem of variability of magnetic field strength caused by temperature fluctuations. The strength of magnetic materials used to mark pages of a book can decrease significantly with a rise in temperature. Often the facility where such books are assembled, and hence where the detector is calibrated, may not be climate controlled. Detectors calibrated during cold winter months may be unreliable when used during hot summer months, and those calibrated during cold winter months may be unreliable when used in hot summer temperatures. Permanent magnets exhibit a temperature dependence in their magnetic field strength. Rubber magnets can lose 3% of their strength for a temperature increase of 20 degrees F. The temperature in a factory during assembly can vary wildly. In Southern China, where many of the world's consumer products are manufactured, a factory floor can easily be 100° F. or higher during the Spring, Summer, or Fall. Temperatures during winter can dip into the 60s. The ambient temperature at the time of use by the consumer/operator would likely be markedly different. Failure to compensate for temperature induced magnetic field strength variation causes a magnetic-based page detection system to perform poorly at temperatures which are warmer or cooler than those at which the detector is calibrated.

Two methods of temperature compensation may be usefully applied. First is temperature compensation applied during page calibration in the factory (hereinafter referred to as "factory compensation"). This generally affects the calibration table. A manufacturer can input the temperature during the initial calibration. Embedded software then uses the input temperature value to shift the calibration table to a standard temperature, such as standard room temperature of 77° F. (25° C.), which approximates the anticipated temperature for typical consumer usage.

A second method is compensation applied during operation based on a real-time temperature input from a temperature sensor, such as a thermistor, (hereinafter referred to as "real-time compensation"). Real-time compensation requires one extra saved value (along with the calibration table). This value is the temperature sensor value during factory calibration. During operation the temperature sensor value is read along with the magnetic sensor output value. The magnetic sensor output value is then adjusted using a gain-offset calculation that includes the current temperature value and the value from the factory calibration. This scales the current magnetic sensor output value for the temperature at which the calibration table was generated. One variation to this approach is to use the real-time temperature value at power-up to adjust the factory calibration values to the current temperature. Incorporating a temperature sensor, such as a thermistor, to measure the ambient temperature allows for compensation of a magnetic sensor output due to temperature. The ambient temperature may be used to adjust the values of the calibration data to increase or decrease the range of values expected as the book pages are opened and closed, or may be used to create new calibration data for the time of use. These two methods are not exclusive and can be applied in tandem or individually.

Alternatively, a simpler, but less accurate, calibration procedure can be applied to compensate for temperature which does not require a temperature sensor, where the book system includes a sensor to detect when the front cover is closed and the output of the magnetic sensor system is measured each time the front cover is closed, such that the resulting measurement is used to adjust the calibration data. The re-calibration procedure will automatically compensate for temperature-induced changes in magnetic field strength of the fixed magnets by shifting the entire calibration table based on the difference between the stored baseline output for a closed book and the current output for a closed book. This method may be less accurate because it assumes that the entire difference between the factory calibration point and the local measurement is due to temperature differences. However, the inaccuracy may be acceptable to achieve a lower manufacturing cost because this method does not require a temperature sensor.

In addition, over time the pages of an audio book may become worn and swell, such that the increased page thicknesses can make the magnetic detector unreliable for the pages most distant from the magnetic detector. Existing apparatus and methods are not capable of recalibrating for given temperature conditions and variations in the physical condition of the pages.

The existing art fails to provide page detection systems which are both inexpensive and can reliably determine which of the multiplicity of pages is open to the reader in a wide variety lighting and temperature conditions, and regardless of the condition of the pages. The public would be benefited by an inexpensive system that can reliably detect the identity of an open page of a book to provide auditory content based on the identity of the open page.

The following represents a list of known related art:

| Reference: | Issued to: | Date of Issue: |
| --- | --- | --- |
| U.S. Pat. 7,111,774 B2 | Song | Sep. 26, 2006 |
| U.S. Pat. 6,763,995 B1 | Song | Jul. 20, 2004 |
| U.S. Pat. 4,884,974 | DeSmet | Dec. 5, 1989 |
| U.S. Pat. 4,990,092 | Cummings | Feb. 5, 1991 |
| U.S. Pat. 5,453,013 | Billings et al | Sep. 26, 1995 |
| U.S. Pat. 5,631,883 | Li | May 20, 1997 |
| U.S. Pat. 5,645,432 | Jessop | Jul. 8, 1997 |
| U.S. Pat 5,707,240 | Haas et al | Jan. 13, 1998 |
| U.S. Pat. 6,064,855 | Ho | May 16, 2000 |
| U.S. Pat. 6,729,543 B1 | Arons et al | May 4, 2004 |
| U.S. Pat. 6,865,367 | Kim et al | Mar. 8, 2005 |
| U.S. Pat. 7,010,261 B2 | Kim et al | Mar. 7, 2006 |

The teachings of each of the above-listed citations (which does not itself incorporate essential material by reference) are herein incorporated by reference. None of the above inventions and patents, taken either singularly or in combination, is seen to describe the instant invention as claimed.

U.S. Pat. No. 4,884,974 to DeSmet teaches an optical page reader system using bar codes printed along an edge of each page and a mirror system to direct the image to an optical reader built into the book holder. No discussion of magnetic page detection methods or apparatus.

U.S. Pat. No. 4,990,092 to Cummings teaches the use of pressure switches arranged on the back end of the book holder. The pages include non-overlapping holes through them so that when a page is turned the pressure switches which are not aligned with the holes are depressed and the page can be determined. Also includes pressure switches arranged below the planes of the pages with corresponding holes through the pages so that a reader can push the buttons and interact with the book. No discussion of magnetic page detection methods or apparatus.

U.S. Pat. No. 5,453,013, to Billings et al, teaches an audio visual book with touchpad switches containing images or symbols matching images or symbols on the pages of the book which, when pressed, produce a sound corresponding to the symbol or graphic. For example, where the story indicates a dog barking, a symbol of a dog would be included on the page corresponding to a touchpad switch with a picture of a dog, and when the dog-switch is pressed the book produces the sound of a dog bark. Billings does not teach or disclose page detection systems, nor does it disclose the use of automatic generation of audio text corresponding to the page to which a book is turned.

U.S. Pat. No. 5,631,883 to Li teaches an audio book with a pressure sensitive conductive page indicator system and ROM module. No discussion of magnetic field sensors.

U.S. Pat. No. 5,645,432 to Jessop teaches electronic book device using pressure sensors and conductors, which must be pressed in a specified sequence for the device to read which page it is on. Jessop does not discuss magnetic sensors.

U.S. Pat. No. 5,707,240 to Haas et al. teaches the use of a plurality of magnets, wherein each page includes a single magnet which overlaps a corresponding magnetic sensor, including Hall effect sensors, on the back of the book holder, and wherein the page magnets do not overlap. Does not teach or address the use of a cumulative magnetic field. Haas discusses arranging the magnets throughout the plane of the page, along a single edge, and discusses use of magnetic sensors on both the front and back covers, as well as within the pages themselves with the magnets embedded in the front and back covers.

U.S. Pat. No. 6,064,855, to Ho, teaches an audio book with magnetic page detectors. Ho, col. 5, lines 39-56, FIG. 6. Uses a "plurality of magnetic field sensors" mounted to the book holder, with a corresponding plurality of "magnetic field generators" mounted to the edges of the pages—one pair corresponding to each page. The magnetic generators—i.e. tabs— do not overlap but are arranged along the page edges so as to not shield each other.

U.S. Pat. No. 6,729,543 to Arons et al. teaches a page detection and book identification system wherein the detector is an optical reader (ccd or scanner) which detects a barcode or other optical coding system printed on the pages using a mirror system. No discussion of magnetic detection.

U.S. Pat. No. 6,865,367 to Kim et al teaches the use of optical interference page detection systems only, using photosensors and holes through the pages. Kim mentions the use of hall sensors and discretely positioned magnets to provide page indications, but discourages this use as expensive because it requires the inclusion of magnets on each page. See Kim '367 at col. 2, lines 1-14.

U.S. Pat. No. 7,010,261 to Kim et al. teaches optical interference page detection systems only, using photosensors and holes through the pages.

U.S. Pat. No. 6,763,995 to Song teaches an electronic book reader system which utilizes magnetic switches, as opposed to field effect sensors. Each page requires an individual magnetic read switch which detects the polarity orientation of the magnet attached to the page.

U.S. Pat. No. 7,111,774 to Song teaches an electronic book reader system using "magnetic signatures" which are detected by "individualized reading elements". The magnetic signatures are merely magnets with specified polarity arrangements and the individualized reading elements are merely reed switches. Each page requires an individual reed switch. Song '774 also discusses a cumulative magnetic field detection method, but does not disclose how such a method could be accomplished in the real world. Song '774 simply states that the system uses layering magnetic materials on top of each other and "magnetic sensors (such as a Hall effect sensors)" to determine how many pages are layered. The patent does not enable a person to make and use the claimed invention because it does not address the type of magnetic material, the method of calibrating the magnetic sensor, nor the effects of temperature variation on such systems—all of which are critical issues to make such a system work. Song '774 does not even address such issues.

Thus, while the foregoing body of art indicates it to be well known to have a book system with page detection for delivery of audio content, the art described above does not teach or suggest a book system with page detection which has the following combination of desirable features: (1) uses a single magnetic sensor and multiple magnets; (2) is inexpensive to manufacture; (3) is able to recalibrate the sensor for current conditions; (4) can reliably detect the correct page in any lighting condition; (5) can reliably detect the correct page in any temperature condition; (6) reliably detect the correct page even where the pages are worn and swollen; (7) can reliably detect the correct page without regard to how the book is held; (8) methods for providing such content reliably; and (9) methods for manufacturing such book systems.

SUMMARY AND ADVANTAGES

An interactive electronic book system is provided and includes: a book including a front cover, a back cover, and a plurality of pages including visual content, wherein said front cover and each of said plurality of pages further includes a pagination magnet, each of said pagination magnets aligned with the other said magnets so as to overlay one another when said front cover and plurality of pages is closed; a magnetic sensor in close proximity to said back cover and aligned with said pagination magnets, wherein said magnetic sensor produces an electrical output related to the cumulative magnetic field from said pagination magnets detected by said magnetic sensor; a speaker; a digital computer in electronic communication with at least said magnetic sensor and said speaker, said digital computer including non-volatile memory, volatile memory, a microprocessor, an analog-to-digital converter for converting said electrical output of said magnetic sensor to a digital form, software instructions for operating said digital computer stored in said non-volatile memory, calibration data related to said magnetic sensor stored in said non-volatile memory, and audio content related to each of said plurality pages of said book stored in said non-volatile memory; wherein said digital computer uses said electrical output of said magnetic sensor and said calibration data to determine which of said plurality of pages said book is open to, and causes said speaker to play said audio content related to said open page.

An interactive electronic book system can include a temperature sensor connected to said book, wherein said temperature sensor produces an electrical output related to the ambient temperature, and wherein said temperature sensor is in electronic communication with said digital computer; temperature compensation data relating to said magnetic sensor and said pagination magnets stored in said non-volatile memory; wherein, said digital computer uses said temperature sensor electrical output and said temperature compensation data in addition to said electrical output of said magnetic sensor and said calibration data to determine which of said plurality of pages said book is open to, and causes said speaker to play said audio content related to said open page. A temperature sensor for an interactive electronic book system is preferably a thermistor.

An interactive electronic book system can include front cover sensing means for sensing when said front cover of said book is closed independently of said magnetic sensor, said front cover sensing means in electronic communication with said digital computer. Front cover sensing means may consist of a pressure switch in electronic communication with said digital computer and a tab attached to said front cover, said tab positioned to contact said pressure switch when said front cover is closed. Front cover sensing means may consist of a second magnetic sensor in electronic communication with said digital computer and a permanent magnet attached to said front cover distal from said front cover pagination magnet so as to overlay said second magnetic sensor. Front cover sensing means may consist of a capacitive proximity sensor in electronic communication with said digital computer. Front cover sensing means may consist of an optical detector.

A method for providing audio content related to the pages of an interactive electronic book is provided and includes the steps of: providing an interactive electronic book system, said electronic book system comprising a book including a front cover, a back cover, and a plurality of pages including visual content, wherein said front cover and each of said plurality of pages further includes a pagination magnet, each of said pagination magnets aligned with the other said magnets so as to overlay one another when said front cover and plurality of pages is closed; a magnetic sensor in close proximity to said back cover and aligned with said pagination magnets, wherein said magnetic sensor produces an electrical output related to the cumulative magnetic field from said pagination magnets overlaying said magnetic sensor; a speaker; a digital computer in electronic communication with at least said magnetic sensor and said speaker, said digital computer including non-volatile memory, volatile memory, a microprocessor, software instructions for operating said digital computer stored in said non-volatile memory, calibration data related to said magnetic sensor and said pagination magnets stored in said non-volatile memory, and audio content related to each of said plurality pages of said book stored in said non-volatile memory; then turning on said electronic book system; reading said calibration data from said non-volatile memory into said volatile memory for manipulation by said digital computer; continuously measuring the output of said magnetic sensor until said output is stable; assigning a current page position from said calibration table which is closest to said magnetic sensor output; retrieving the audio content corresponding to the current page from said non-volatile memory and playing said audio content through said speaker; calculating the page detection range for the assigned current page position; if the stable temperature compensated output of said magnetic sensor changes outside the detection range for the assigned current page, then repeating steps of: continuously measuring the output of said magnetic sensor; assigning a current page position from said calibration table; retrieving the audio content corresponding to the current page; and calculating the page detection range.

A method for providing audio content related to the pages of an interactive electronic book is provided and includes the steps of: providing an interactive electronic book system, said electronic book system comprising a book including a front cover, a back cover, and a plurality of pages including visual content, wherein said front cover and each of said plurality of pages further includes a pagination magnet, each of said pagination magnets aligned with the other said magnets so as to overlay one another when said front cover and plurality of pages is closed; a magnetic sensor in close proximity to said back cover and aligned with said pagination magnets, wherein said magnetic sensor produces an electrical output related to the cumulative magnetic field from said pagination magnets overlaying said magnetic sensor; a temperature sensor connected to said book, wherein said temperature sensor produces an electrical output related to the ambient temperature; a speaker; a digital computer in electronic communication with at least said magnetic sensor, said temperature sensor, and said speaker, said digital computer including non-volatile memory, volatile memory, a microprocessor, software instructions for operating said digital computer stored in said non-volatile memory, calibration data related to said magnetic sensor and said pagination magnets stored in said non-volatile memory, temperature compensation data relating to said magnetic sensor and said pagination magnets stored in said non-volatile memory, and audio content related to each of said plurality pages of said book stored in said non-volatile memory; then, turning on said electronic book system; reading said calibration data from said non-volatile memory into said volatile memory for manipulation by said digital computer; continuously measuring the output of said magnetic sensor until said output is stable; continuously measuring the output of said temperature sensor and calculating the average ambient temperature; calculating the temperature compensated output for said magnetic sensor output based on said average ambient temperature in accordance with the equation: Vcomp=Vuncomp+(Tstandard−Tambient)×Ct, where: Vcomp is the temperature compensated output of said magnetic sensor, Vuncomp is the non-temperature compensated output of said magnetic sensor, Tstandard is the selected standard temperature for calibration, Tambient is the measured average ambient temperature, and Ct is the correction factor determined experimentally for said pagination magnets; then, assigning a current page position from said calibration table which is closest to said temperature compensated output; retrieving the audio content corresponding to the current page from said non-volatile memory and playing said audio content through said speaker; calculating the page detection range for the assigned current page position; and if the stable temperature compensated output of said magnetic sensor changes outside the detection range for the assigned current page, then repeating the steps of: continuously measuring the output of said magnetic sensor; continuously measuring the output of said temperature sensor; calculating the temperature compensated output of said magnetic sensor; assigning a current page position; retrieving the audio content corresponding to the current page; and calculating the page detection range.

A method of calibrating an interactive electronic book system utilizing magnetic page detection, is provided and includes the steps of: providing an electronic book, said electronic book comprising a book including a front cover, a back cover, and a plurality of pages including visual content, wherein said front cover and each of said plurality of pages further includes a pagination magnet, each of said pagination magnets aligned with the other said magnets so as to overlay one another when said front cover and plurality of pages is closed; a magnetic sensor in close proximity to said back cover and aligned with said pagination magnets, wherein said magnetic sensor produces an electrical output related to the cumulative magnetic field from said pagination magnets detected by said magnetic sensor; a temperature sensor connected to said book, wherein said temperature sensor produces an electrical output related to the ambient temperature; a speaker; and a digital computer in electronic communication with said magnetic sensor, said temperature sensor, and said speaker, said digital computer including non-volatile memory, volatile memory, a microprocessor, software instructions for operating said digital computer stored in said non-volatile memory, calibration data related to said magnetic sensor stored in said non-volatile memory, temperature compensation data relating to said magnetic sensor and said pagination magnets stored in said non-volatile memory, and audio content related to each of said plurality pages of said book stored in said non-volatile memory; then, closing said book front cover; measuring and recording the output of said magnetic sensor with said front cover closed; opening said front cover to the first page of said plurality of pages; measuring and recording the output of said magnetic sensor with said book open to said first page; comparing the output of said magnetic sensor with said front cover closed to the output with said front cover open to determine if the change in output is in the expected direction, and rejecting the calibration if the change is not in the expected direction; opening said book to the next page of said plurality of pages; measuring and recording the output of said magnetic sensor with said next page open; determining if the change in output of said magnetic sensor from the previous page to the current page is in the expected direction, and rejecting the calibration if the change is not in the expected direction; determining if the magnitude of the change in output of said magnetic sensor from the previous page to the current page is in the expected range, and rejecting the calibration if the change is not in the expected range; for each remaining page of said plurality of pages, repeating the steps: of opening said book to the next page, measuring and recording the output of said magnetic sensor, determining if the change in output of said magnetic sensor is in the expected direction, and determining if the magnitude of the change in output of said magnetic sensor is in the expected range; measuring and recording the average ambient temperature; centering the calibration data consisting of the recorded outputs of said magnetic sensor corresponding to said front cover and each of said plurality of pages by multiplying said calibration data by a temperature correction factor determined for said pagination magnets; and storing the centered calibration data in a calibration data table in said non-volatile memory.

The apparatus and methods for an electronic interactive book system of the present invention presents numerous advantages, including: (1) uses a single magnetic sensor and multiple magnets; (2) is inexpensive to manufacture; (3) is able to recalibrate the sensor for current conditions; (4) can reliably detect the correct page in any lighting condition; (5) can reliably detect the correct page in any temperature condition; (6) reliably detect the correct page even where the pages are worn and swollen; (7) can reliably detect the correct page without regard to how the book is held; (8) methods for providing such content reliably; and (9) methods for manufacturing such book systems.

Additional advantages of the invention will be set forth in part in the description which follows, and in part will be obvious from the description, or may be learned by practice of the invention. The advantages of the invention may be realized and attained by means of the instrumentalities and combinations, particularly pointed out in the appended claims. Further benefits and advantages of the embodiments of the invention will become apparent from consideration of the following detailed description given with reference to the accompanying drawings, which specify and show preferred embodiments of the present invention.

BRIEF DESCRIPTION OF THE DRAWINGS

The accompanying drawings, which are incorporated into and constitute a part of this specification, illustrate one or more embodiments of the present invention and together with the detailed description, serve to explain the principles and implementations of the invention.

DETAILED DESCRIPTION

Figure 1:
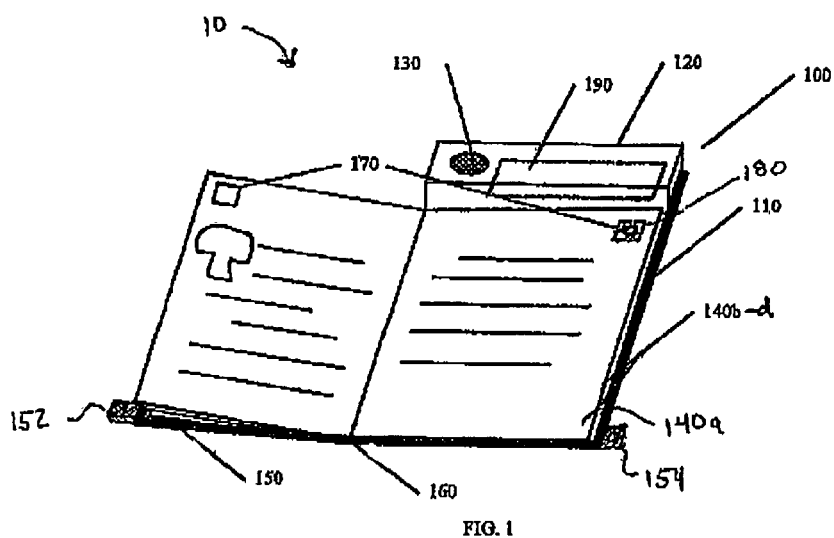
FIG. 1 shows an embodiment of the invention.

Before beginning a detailed description of the subject invention, mention of the following is in order. When appropriate, like reference materials and characters are used to designate identical, corresponding, or similar components in differing figure drawings. The figure drawings associated with this disclosure typically are not drawn with dimensional accuracy to scale, i.e., such drawings have been drafted with a focus on clarity of viewing and understanding rather than dimensional accuracy.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In the context of this Specification, the term "visual content" includes both printed words or images alone, or a combination of printed words and images. It will be understood by persons of ordinary skill in the art that the individual pages of a book may have printing on both the front and back sides of each page, so that a book opened to a particular page may include content on both the left-hand page and the right-hand page. Therefore, in the context of this Specification, when referring to the content of an "open page" this is understood to refer to both the left-hand and right-hand pages.

An interactive electronic book system is provided and includes: a book including a front cover, a back cover, and a plurality of pages including visual content, wherein said front cover and each of said plurality of pages further includes a pagination magnet, each of said pagination magnets aligned with the other said magnets so as to overlay one another when said front cover and plurality of pages is closed; a magnetic sensor in close proximity to said back cover and aligned with said pagination magnets, wherein said magnetic sensor produces an electrical output related to the cumulative magnetic field from said pagination magnets detected by said magnetic sensor; a speaker; a digital computer in electronic communication with at least said magnetic sensor and said speaker, said digital computer including non-volatile memory, volatile memory, a microprocessor, an analog-to-digital converter for converting said electrical output of said magnetic sensor to a digital form, software instructions for operating said digital computer stored in said non-volatile memory, calibration data related to said magnetic sensor stored in said non-volatile memory, and audio content related to each of said plurality pages of said book stored in said non-volatile memory; wherein said digital computer uses said electrical output of said magnetic sensor and said calibration data to determine which of said plurality of pages said book is open to, and causes said speaker to play said audio content related to said open page.

An interactive electronic book system can include a temperature sensor connected to said book, wherein said temperature sensor produces an electrical output related to the ambient temperature, and wherein said temperature sensor is in electronic communication with said digital computer; temperature compensation data relating to said magnetic sensor and said pagination magnets stored in said non-volatile memory; wherein, said digital computer uses said temperature sensor electrical output and said temperature compensation data in addition to said electrical output of said magnetic sensor and said calibration data to determine which of said plurality of pages said book is open to, and causes said speaker to play said audio content related to said open page. A temperature sensor for an interactive electronic book system is preferably a thermistor.

An interactive electronic book system can include front cover sensing means for sensing when said front cover of said book is closed independently of said magnetic sensor, said front cover sensing means in electronic communication with said digital computer. Front cover sensing means may consist of a pressure switch in electronic communication with said digital computer and a tab attached to said front cover, said tab positioned to contact said pressure switch when said front cover is closed. Front cover sensing means may consist of a second magnetic sensor in electronic communication with said digital computer and a permanent magnet attached to said front cover distal from said front cover pagination magnet so as to overlay said second magnetic sensor. Front cover sensing means may consist of a capacitive proximity sensor in electronic communication with said digital computer. Front cover sensing means may consist of an optical detector.

A method for providing audio content related to the pages of an interactive electronic book is provided and includes the steps of: providing an interactive electronic book system, said electronic book system comprising a book including a front cover, a back cover, and a plurality of pages including visual content, wherein said front cover and each of said plurality of pages further includes a pagination magnet, each of said pagination magnets aligned with the other said magnets so as to overlay one another when said front cover and plurality of pages is closed; a magnetic sensor in close proximity to said back cover and aligned with said pagination magnets, wherein said magnetic sensor produces an electrical output related to the cumulative magnetic field from said pagination magnets overlaying said magnetic sensor; a speaker; a digital computer in electronic communication with at least said magnetic sensor and said speaker, said digital computer including non-volatile memory, volatile memory, a microprocessor, software instructions for operating said digital computer stored in said non-volatile memory, calibration data related to said magnetic sensor and said pagination magnets stored in said non-volatile memory, and audio content related to each of said plurality pages of said book stored in said non-volatile memory; then turning on said electronic book system; reading said calibration data from said non-volatile memory into said volatile memory for manipulation by said digital computer; continuously measuring the output of said magnetic sensor until said output is stable; assigning a current page position from said calibration table which is closest to said magnetic sensor output; retrieving the audio content corresponding to the current page from said non-volatile memory and playing said audio content through said speaker; calculating the page detection range for the assigned current page position; if the stable temperature compensated output of said magnetic sensor changes outside the detection range for the assigned current page, then repeating steps of: continuously measuring the output of said magnetic sensor; assigning a current page position from said calibration table; retrieving the audio content corresponding to the current page; and calculating the page detection range.

A method for providing audio content related to the pages of an interactive electronic book is provided and includes the steps of: providing an interactive electronic book system, said electronic book system comprising a book including a front cover, a back cover, and a plurality of pages including visual content, wherein said front cover and each of said plurality of pages further includes a pagination magnet, each of said pagination magnets aligned with the other said magnets so as to overlay one another when said front cover and plurality of pages is closed; a magnetic sensor in close proximity to said back cover and aligned with said pagination magnets, wherein said magnetic sensor produces an electrical output related to the cumulative magnetic field from said pagination magnets overlaying said magnetic sensor; a temperature sensor connected to said book, wherein said temperature sensor produces an electrical output related to the ambient temperature; a speaker; a digital computer in electronic communication with at least said magnetic sensor, said temperature sensor, and said speaker, said digital computer including non-volatile memory, volatile memory, a microprocessor, software instructions for operating said digital computer stored in said non-volatile memory, calibration data related to said magnetic sensor and said pagination magnets stored in said non-volatile memory, temperature compensation data relating to said magnetic sensor and said pagination magnets stored in said non-volatile memory, and audio content related to each of said plurality pages of said book stored in said non-volatile memory; then, turning on said electronic book system; reading said calibration data from said non-volatile memory into said volatile memory for manipulation by said digital computer; continuously measuring the output of said magnetic sensor until said output is stable; continuously measuring the output of said temperature sensor and calculating the average ambient temperature; calculating the temperature compensated output for said magnetic sensor output based on said average ambient temperature in accordance with the equation: Vcomp=Vuncomp+(Tstandard−Tambient)×Ct, where: Vcomp is the temperature compensated output of said magnetic sensor, Vuncomp is the non-temperature compensated output of said magnetic sensor, Tstandard is the selected standard temperature for calibration, Tambient is the measured average ambient temperature, and Ct is the correction factor determined experimentally for said pagination magnets; then, assigning a current page position from said calibration table which is closest to said temperature compensated output; retrieving the audio content corresponding to the current page from said non-volatile memory and playing said audio content through said speaker; calculating the page detection range for the assigned current page position; and if the stable temperature compensated output of said magnetic sensor changes outside the detection range for the assigned current page, then repeating the steps of: continuously measuring the output of said magnetic sensor; continuously measuring the output of said temperature sensor; calculating the temperature compensated output of said magnetic sensor; assigning a current page position; retrieving the audio content corresponding to the current page; and calculating the page detection range.

A method of calibrating an interactive electronic book system utilizing magnetic page detection, is provided and includes the steps of: providing an electronic book, said electronic book comprising a book including a front cover, a back cover, and a plurality of pages including visual content, wherein said front cover and each of said plurality of pages further includes a pagination magnet, each of said pagination magnets aligned with the other said magnets so as to overlay one another when said front cover and plurality of pages is closed; a magnetic sensor in close proximity to said back cover and aligned with said pagination magnets, wherein said magnetic sensor produces an electrical output related to the cumulative magnetic field from said pagination magnets detected by said magnetic sensor; a temperature sensor connected to said book, wherein said temperature sensor produces an electrical output related to the ambient temperature; a speaker; and a digital computer in electronic communication with said magnetic sensor, said temperature sensor, and said speaker, said digital computer including non-volatile memory, volatile memory, a microprocessor, software instructions for operating said digital computer stored in said non-volatile memory, calibration data related to said magnetic sensor stored in said non-volatile memory, temperature compensation data relating to said magnetic sensor and said pagination magnets stored in said non-volatile memory, and audio content related to each of said plurality pages of said book stored in said non-volatile memory; then, closing said book front cover; measuring and recording the output of said magnetic sensor with said front cover closed; opening said front cover to the first page of said plurality of pages; measuring and recording the output of said magnetic sensor with said book open to said first page; comparing the output of said magnetic sensor with said front cover closed to the output with said front cover open to determine if the change in output is in the expected direction, and rejecting the calibration if the change is not in the expected direction; opening said book to the next page of said plurality of pages; measuring and recording the output of said magnetic sensor with said next page open; determining if the change in output of said magnetic sensor from the previous page to the current page is in the expected direction, and rejecting the calibration if the change is not in the expected direction; determining if the magnitude of the change in output of said magnetic sensor from the previous page to the current page is in the expected range, and rejecting the calibration if the change is not in the expected range; for each remaining page of said plurality of pages, repeating the steps: of opening said book to the next page, measuring and recording the output of said magnetic sensor, determining if the change in output of said magnetic sensor is in the expected direction, and determining if the magnitude of the change in output of said magnetic sensor is in the expected range; measuring and recording the average ambient temperature; centering the calibration data consisting of the recorded outputs of said magnetic sensor corresponding to said front cover and each of said plurality of pages by multiplying said calibration data by a temperature correction factor determined for said pagination magnets; and storing the centered calibration data in a calibration data table in said non-volatile memory.

Referring to FIGS. 1-4, a first embodiment of an electronic interactive book system 10 includes a book 100 with a front cover 150, a back cover 110, and a plurality of pages 140 including visual content, wherein front cover 150 and each of plurality of pages 140 further includes a pagination magnet 170, each of pagination magnets 170 aligned with the other magnets 170 so as to overlay one another when front cover 150 and plurality of pages 140 is closed; a magnetic sensor 180 in close proximity to back cover 110 and aligned with pagination magnets 170, wherein magnetic sensor 180 produces an electrical output Vout related to the cumulative magnetic field from pagination magnets 170 overlaying magnetic sensor 180; a speaker 130; a digital computer 190 in electronic communication with at least magnetic sensor 180 and speaker 130, digital computer including non-volatile memory 194, volatile memory 196, a microprocessor 192, an analog-to-digital converter 198 for converting the electrical output Vout of magnetic sensor 180 to a digital form, software instructions for operating the digital computer stored in non-volatile memory 194, calibration data related to magnetic sensor 180 stored in said non-volatile memory 194, and audio content related to each of the plurality of pages 140 of book 100 stored in non-volatile memory 194; wherein digital computer 190 uses electrical output Vout of magnetic sensor 180 and the calibration data to determine which of the plurality of pages 140 the book 100 is open to, and causes speaker 130 to play the audio content related to the open page.

Preferably magnetic sensor 180, digital computer 190, and speaker 130 are contained in a housing 120 which is attached to book 100 at back cover 110. Mounting the electronic components in a housing 120 to which book 100 can be attached can simplify the manufacturing process. Housing 120 may include a power supply (not shown) for operating the electronic book system. Speaker 130 is preferably located in the housing 120, but may alternatively may be located separately and connected by wiring, such as using headphones and headphones jacks or using portable speakers and speaker jacks. Wireless connections could also be used.

Pages 140, front cover 150 and back cover 110 are preferably bound together at binding 160, using binding glue or other known methods for binding, so as to allow the pages 140 and front cover 150 to open (move away from the back cover 150) and close (move toward the back cover 150) while minimizing the lateral movement of the pages 140 in the closed position. Preferably pages 140 are made from thick paper, cardboard, or printable plastic sheet, so that they retain some rigidity but can withstand rough use.

Figure 2:
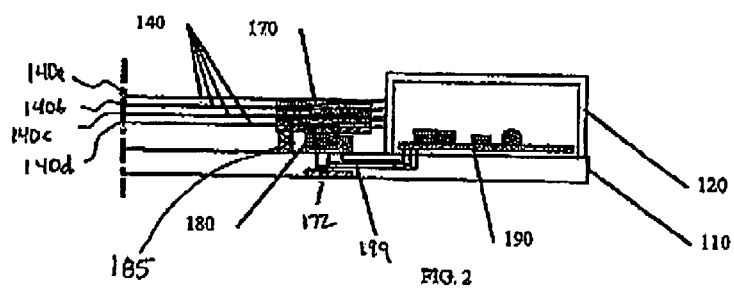
FIG. 2 shows a right-side cross-sectional view of the embodiment shown in FIG. 1.
Figure 3:
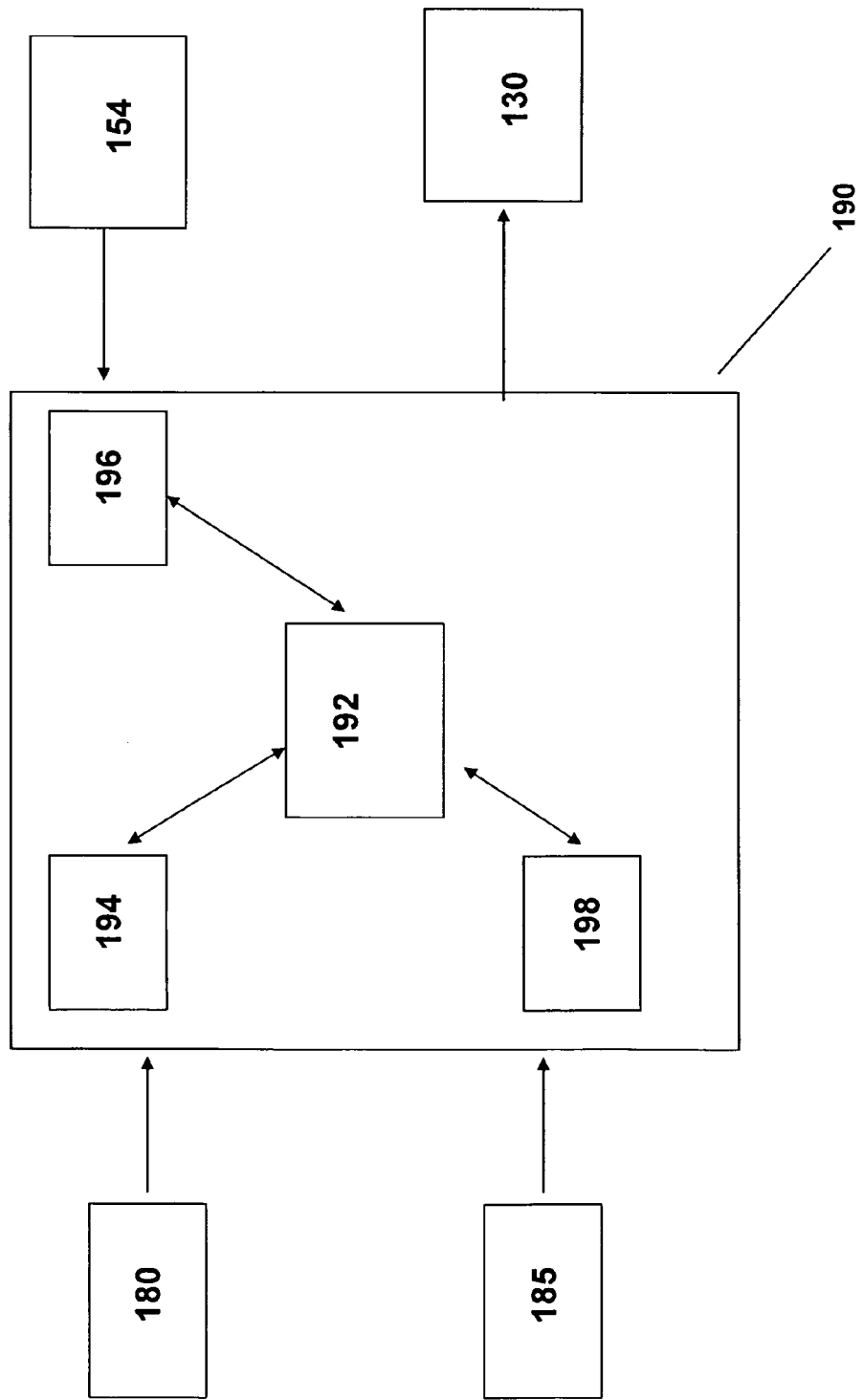
FIG. 3 shows a schematic circuit diagram of the embodiment shown in FIG. 1.

Referring to FIGS. 1-3, in a first embodiment an open page 140a, and closed pages 140b-d, are shown. Pagination magnets 170 are permanent magnets affixed to each of pages 140a-d and front cover 150, respectively. Magnets 170 are polarized in a direction perpendicular to the plane of the pages 140. The magnets 170 are aligned with one another and centered over magnetic sensor 180 mounted on back cover 110. Preferably, pagination magnets 170 are flexible rubber magnets 0.013 inches (0.33 mm) thick, which provides adequate magnet strength for reliable operation and which are flexible so as to better conform to flexible pages 140, and which are commonly available and relatively inexpensive.

Digital computer 190 is preferably a small digital computer mounted on a circuit board, and includes computer readable non-volatile memory 194 for storing software instructions for operating the electronic interactive book system 10 and for storing audio content related to the pages 140 of book 100, a microprocessor 192, volatile memory 196 for loading software and data from non-volatile memory 194 to be used by microprocessor 192, an analog-to-digital converter 198, and communications circuitry to provide electronic communications between and among components. Computer 190 may be constructed or assembled in a variety of alternative configurations. Microprocessor 192 is preferably a serial bit processor in order to reduce cost, but other microprocessors could be used. Computer 190 is in electronic communication with at least magnetic sensor 180 and speaker 130, and may be in electronic communication with other components and/or peripheral devices.

Speaker 130 is provided to convey audio content related to a specific open page 140a to the user. Speaker 130 is preferably included in the housing 120 of book 100, but may include external speaker devices. Speaker 130 is in electronic communication with computer 190 in order to receive and broadcast audio content retrieved from non-volatile memory 194 of computer 190.

Magnetic sensor 180 is preferably attached to back cover 110, to which is also attached housing 120 containing computer 190. Magnetic sensor 180 is electrically connected to computer 190 by means of wires 199. Each of the plurality of pages 140 has affixed a pagination magnet 170, preferentially on the surface nearer the magnetic sensor 180. All of the magnets 170 are aligned with one another and with magnetic sensor 180. Magnets 170 preferably are larger than magnetic sensor 180, to avoid the effect of fringing fields. Each of the magnets 170 is polarized perpendicular to the plane of the pages 140, and the alignment of the polarization is identical, either north toward back cover 110 or south toward back cover 110. This arrangement of magnets 170 has the beneficial effect that the mutual attraction of the magnets 170 pulls each successive closed page 140b-d into close proximity with previously-closed pages and with the magnetic sensor 180.

Magnetic sensor 180 is preferably a Hall effect sensor, which are relatively inexpensive, rugged and reliable.

Referring again to FIGS. 1-3, a temperature sensor 185 may be incorporated to provide temperature compensation. Preferably temperature sensor 185 is a thermistor. A-D converter 198 may include a second channel to convert the analog output of temperature sensor 185 to digital value for use by computer 190. Alternatively, a second A-D converter may be provided for use by temperature sensor 185. Alternatively, temperature sensor 185 may include a self-contained A-D converter to provide a digital value directly to computer 190.

In operation, a reader may read electronic book system 10 like a normal book. Magnetic sensor 180 produces a voltage output proportional to the cumulative magnetic field of the overlaying magnets 170 affixed to closed pages 140b-d. The voltage output of magnetic sensor 180 provides input to computer 190. Computer 190 includes analog-to-digital-converter (A-D converter) 198 which converts the voltage output Vout of magnetic sensor 180 into a digital value for manipulation by computer 190. Computer 190 executes software instructions stored in non-volatile memory 194 and read into volatile memory 196 to determine which page 140 is open and retrieve the stored content and relating to open page 140a. Computer 190 compares the output from magnetic sensor 180, which is converted to a digital value through A-D converter 198, to the calibration table of expected values stored in non-volatile memory 194. If the output is equal to the predicted value of a page 140 within a designated range, preferably plus-or-minus forty percent (+/−40%) of the predicted value, then the content corresponding to that page is retrieved from non-volatile memory 194 of computer 190.

The predicted value of a page 140 may be determined by application of a non-linear algorithm to calculate the correct value. The non-linear algorithm accounts for the non-linear summing of the cumulative magnetic field strengths of magnets 170. As each magnet 170 is stacked on top of the previous magnet it is slightly farther away, and has an additional page sheet 140 interposed between it and magnetic sensor 180, so that its effect on magnetic sensor 180 is less than that of the next closer magnet. For a given type of magnet 170, and a given material and thickness of page 140, this algorithm can be determined experimentally through measurement and used to identify which page 140 is the top-most or open page.

Figure 4:
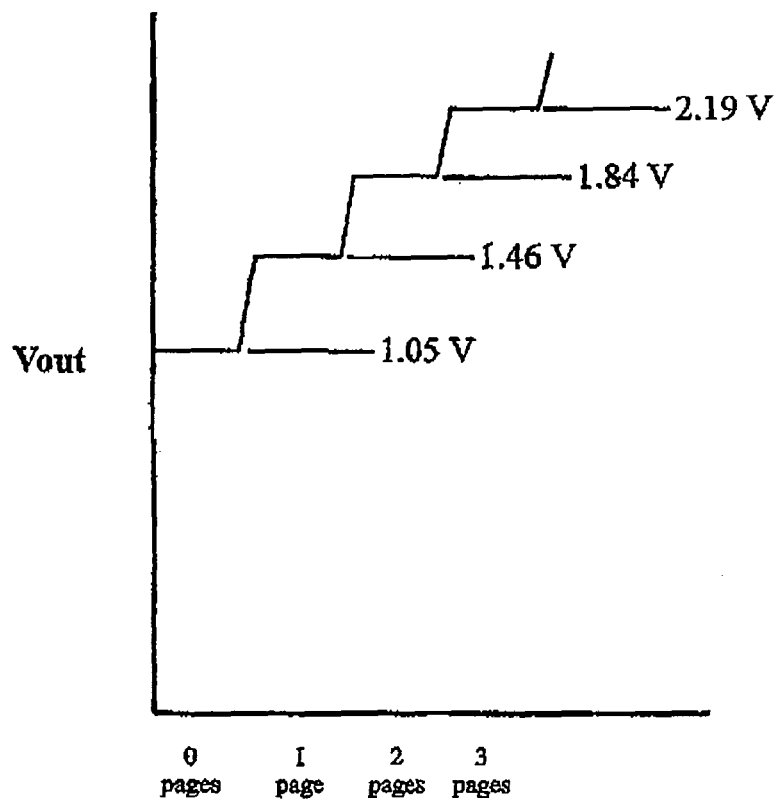
FIG. 4 shows a voltage trace obtained from the magnetic sensor of the embodiment shown in FIG. 1.

Referring to FIG. 4, the output values Vout of magnetic sensor 180 for three pages 140 are shown. With all pages 140 open (i.e. no pagination magnets 170 overlaying magnetic sensor 180) output Vout is 1.05V. With book 100 open to the back page 140d the output is 1.46V, a change of a change of +0.41V. With the book 100 open to second to back page 140c the output Vout is 1.84V, a change of +0.38V. With the book open to the third to back page 140b the output Vout of magnetic sensor 180 is 2.19V, a change of +0.35V. As can be seen, the non-linear change for each page 140, starting from the back page, will be +0.41V, +0.38V, +0.35V . . . , etc. Thus, the magnitude of the step change in the output Vout of magnetic sensor 180 decreases by 0.03V for each additional page. The exact value of the change will be dependent on the strength and thickness of magnets 170, the thickness and material of pages 140, and the characteristics of sensor 180, but for each combination the changes are predictable and may be reduced to a non-linear algorithm for calculating the predicted value for each page. Alternatively, for a book 100 with a small number of pages, the values can be stored as a calibration table in the non-volatile memory 194 of computer 190. The inventors found that beyond approximately seven pages 140 the change in output of magnetic sensor 180 was too small to reliably distinguish between pages without using a more sensitive (and therefore more expensive) magnetic sensor 180 or stronger (and therefore more expensive, bulkier and heavier) magnets 170. In this first embodiment, magnets 170 are flexible rubber magnets 0.013 inches (0.33 mm) thick. Preferably pagination magnets 170 are rubber magnets 0.013 inches (0.33 mm) thick. Pagination magnets may also be made from magnetic material applied to pages 140.

The attractive force of the magnets 170 to one another also keeps the magnets 170 in relative alignment even if the reader flutters or tugs at the edges of pages 140. The reader must exert a definite force to open any closed page 140. On the other hand, the presence of the magnets 170 on the back side of each page 140 creates a small gap between the pages 140, which makes it easier for the reader to separate the pages 140 and selectively grasp a desired page 140 or group of pages.

The attractive effect of the magnets 170 may be enhanced by use of a magnetic enhancer plate 172. Enhancer plate 172 may be a magnet or a plate of ferromagnetic material (e.g. mild steel), preferably attached to back cover 110, which will cause the magnets 170 attached to the pages 140 to be more firmly held against magnetic sensor 180. Preferably magnetic enhancer plate 172 is a doughnut-shaped magnet with a hole in the center, to provide better shaping of magnetic flux lines. Preferably magnetic enhancer plate 172 is mounted to back cover 110 directly behind magnetic sensor 180. Where a magnet is used for magnetic enhancer plate 172, the magnet 172 is polarized perpendicular to the plane of the back cover 110 in the same direction of polarization as pagination magnets 170. Magnetic enhancer plate 172 will attract magnets 170 without significantly reducing the sensitivity of magnetic sensor 180. Where a ferromagnetic plate is used for magnetic enhancer plate 172, the magnets 170 affixed to the pages 140 will be attracted to the plate, but the plate will not itself generate a large magnetic field. Preferably a ferromagnetic plate would be of at least the same dimensions as pagination magnets 170.

Magnetic sensor 180 operates in a linear sensing mode and produces an output voltage Vout related to the cumulative magnetic field strength of pagination magnets 170 overlaying magnetic sensor 180. Referring to FIG. 3 a simplified schematic diagram of a first embodiment shows a Hall Effect magnetic sensor 180 connected to computer 190 which includes an A-D converter 198 to convert the analog Vout signal to a digital value for manipulation by computer 190. A-D converter 198 may be implemented in a variety of ways including as a stand alone peripheral device or as an internal component within digital computer 190. Preferably A-D converter 198 is an internal component mounted on a common PCB card with the other components of digital computer 190. For purposes of illustration A-D converter 198 is described as being part of computer 190, even if it consists of a stand alone peripheral device.

Software instructions to operate the electronic book system 10 are stored in non-volatile memory 194 in computer 190. When the system is turned on, or reactivated from a sleep mode or standby mode, the software instructions are read into volatile memory 196 from non-volatile memory 194 to be executed by microprocessor 192. Computer 190 receives the output Vout of magnetic sensor 180 and compares the value to the values corresponding to individual pages 140 stored in a calibration table in non-volatile memory 194, which is read into volatile memory 196 as needed for use. Computer 190 assigns a page number corresponding to the page number in the stored calibration table with the closest Vout value, retrieves the stored audio content corresponding to the assigned page number from non-volatile memory 194, and electronically communicates the stored audio content to speaker 130, causing speaker 130 to audibly broadcast the stored content corresponding to the open page. In this way a child may read along the page with the audio content. In the first embodiment, the audio content is played out through speaker 130 mounted within housing 120.

Referring again to FIG. 3, temperature sensor 185 may be included to provide temperature compensation to the output voltage Vout of magnetic sensor 180. Temperature sensor 185 is in electronic communication with computer 190. Temperature sensor 185 provides an output proportional to ambient temperature to computer 190. Temperature compensation data relating to magnetic sensor 180 and pagination magnets 170 is stored in a non-volatile memory 194. Computer 190 uses the temperature compensation data, in addition to the magnetic sensor calibration data stored in non-volatile memory 194, to correct the output Vout of magnetic sensor 180 for the ambient temperature when determining which page is open.

It will be understood by persons of ordinary skill in the art that computer 190 may be constructed and assembled in a number of alternative ways. Either or both of non-volatile memory 194 and volatile memory 196 may be contained on the same computer chip as the microprocessor, or on separate memory chips. Non-volatile memory 194 might be segregated on separate memory chips. Different methods may be used to implement communications between the components of computer 190, and between peripherals, as well, depending on the selection of components.

As shown in FIG. 4 the size of each successive voltage step change is diminished because each additional magnet 170 is further from the magnetic sensor and therefore generates a smaller field increment. This effect was observed by the inventor, who realized that a system that assumed the measured voltage was linearly proportional to the number of magnets 170 overlaying magnetic sensor 180 would not properly determine the number of closed pages 140, and therefore might deliver the wrong audio content for a given page. This problem is addressed by providing a method of delivering audio content including calibration steps and application of a non-linear algorithm.

Figure 5:
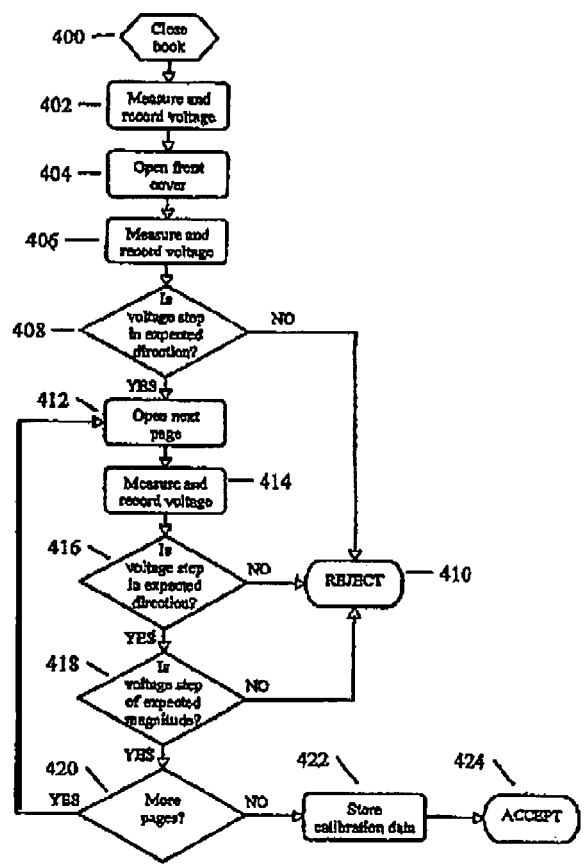
FIG. 5 shows a flow chart of a method for calibrating an electronic interactive book system with a magnetic page sensor.

Referring to FIG. 5, and to FIGS. 1-4, a method of calibrating an electronic interactive book system includes the steps of: providing an electronic book 10 comprising a book 100 including a front cover 150, a back cover 110, and a plurality of pages 140 including visual content, wherein front cover 150 and each of the plurality of pages 140 further includes a pagination magnet 170, with each of pagination magnets 170 aligned with the other magnets 170 so as to overlay one another when front cover 150 and plurality of pages 140 is closed; a magnetic sensor 180 in close proximity to back cover 110 and aligned with pagination magnets 170, wherein magnetic sensor 180 produces an electrical output Vout related to the cumulative magnetic field from pagination magnets 170 overlaying magnetic sensor 180; a speaker 130; a digital computer 190 in electronic communication with at least magnetic sensor 180 and speaker 130, digital computer 190 including non-volatile memory 194, volatile memory 196, a microprocessor 192, software instructions for operating digital computer 190 stored in non-volatile memory 194, calibration data related to magnetic sensor 180 stored in non-volatile memory 194, temperature compensation data relating to magnetic sensor 180 and pagination magnets 170 stored in non-volatile memory 194, and audio content related to each of the plurality pages 140 of book 100 stored in non-volatile memory 194; closing the book 100; measuring and recording the output voltage of the magnetic sensor 180; opening the front cover 150 of the book 100; measuring and recording the output voltage Vout of the magnetic sensor 180; if the voltage step is not in the expected direction then stop and reject the book 100; if the recorded output voltage Vout is not within the acceptable range of the predicted magnitude then rejecting the book 100; if the direction of the voltage step and the magnitude of the output voltage Vout are acceptable, then opening the next page 140 of the book 100; measuring and recording the output voltage Vout of the magnetic sensor 180; if the voltage step is not in the expected direction then stop and reject the book 100; if the recorded output voltage Vout is not within the acceptable range of the predicted magnitude then rejecting the book 100; if the direction of the voltage step and the magnitude of the output voltage are acceptable, then repeating for each page 140 the steps of opening the next page of the book 100, measuring and recording the output voltage Vout of the magnetic sensor 180; rejecting the book 100 if the voltage step is not in the expected direction; and rejecting the book 100 if the voltage magnitude is not within the acceptable range; then, storing the values of the output voltage Vout for each page 140 in the calibration data table; and accepting the calibration.

Referring again to FIG. 5, and FIGS. 1-4, at the beginning of the calibration process at a step 400 the book 100 is closed. At a first step 402 the voltage output Vout of magnetic sensor 180 is measured and the value is recorded. At a next step 404 the front cover 150 of book 100 is opened. At a step 406 the voltage output Vout of the magnetic sensor 180 is measured and the value is recorded. At a step 408 the change in output voltage Vout (the "voltage step") between the first and second voltage measurements is computed and the sign of the voltage step is examined. If the voltage step is not in the expected direction the book is rejected at a step 410. If the recorded output voltage Vout is not within an acceptable range of the predicted magnitude the book 100 is rejected at a step 410. If the voltage step is in the expected direction, at a step 412 the next page 140 is opened. At a step 414 the voltage output Vout of the magnetic sensor 180 is measured and the value is recorded. At a step 416 the voltage step between the current voltage output Vout and the voltage output Vout for the previous page (in this case the front cover 150) is computed and the sign of the voltage step is examined. If the voltage step is not in the expected direction the book 100 is rejected at a step 410. If the voltage step is in the expected direction, the voltage step is compared with the previous voltage step. If the new voltage step is not within an acceptable range of the predicted magnitude (typically between 90% and 110% of the predicted magnitude) the book 100 is rejected at a step 410. At a decision step 420 the process of checking the output voltage Vout for each page 140 continues until the book 100 is completely open and no more pages 140 overlay back cover 110. After the last page 140 is checked, at a step 422 the calibration data is stored in non-volatile memory in the computer 190 and the book 100 is accepted at a step 424. Once the calibration data is stored in non-volatile memory, the book 100 can be used by a reader.

Preferably the acceptable range of the predicted magnitude is between 95% and 105% of the predicted magnitude. This range allows for normal variation due to minor variations in magnet strength, background noise, variations in pages due to manufacturing processes or swelling from moisture and wear, and other system variables, but is narrow enough to prevent overlap in ranges for successive pages.

During the calibration process a book might be rejected at step 408 or step 416 because a magnet 170 is polarized in the wrong direction. A magnet 170 with reverse polarization will cancel the effect of an adjacent magnet 170 of correct polarization, thus reducing rather than augmenting the output voltage of magnetic sensor 180 as the magnet 170 is added to the stack. If a magnet 170 is of the correct polarity but is too weak or otherwise misaligned, this will be detected by the test at step 418.

Alternatively, the calibration may begin with the book 100 completely open, and pages 140 are closed one at a time, with each successive step in output voltage Vout tested for the correct direction, and each step after the first compared for the proper magnitude range relative to the previous step. The method of proceeding from front to back or back to front are essentially equivalent.

Figure 8:
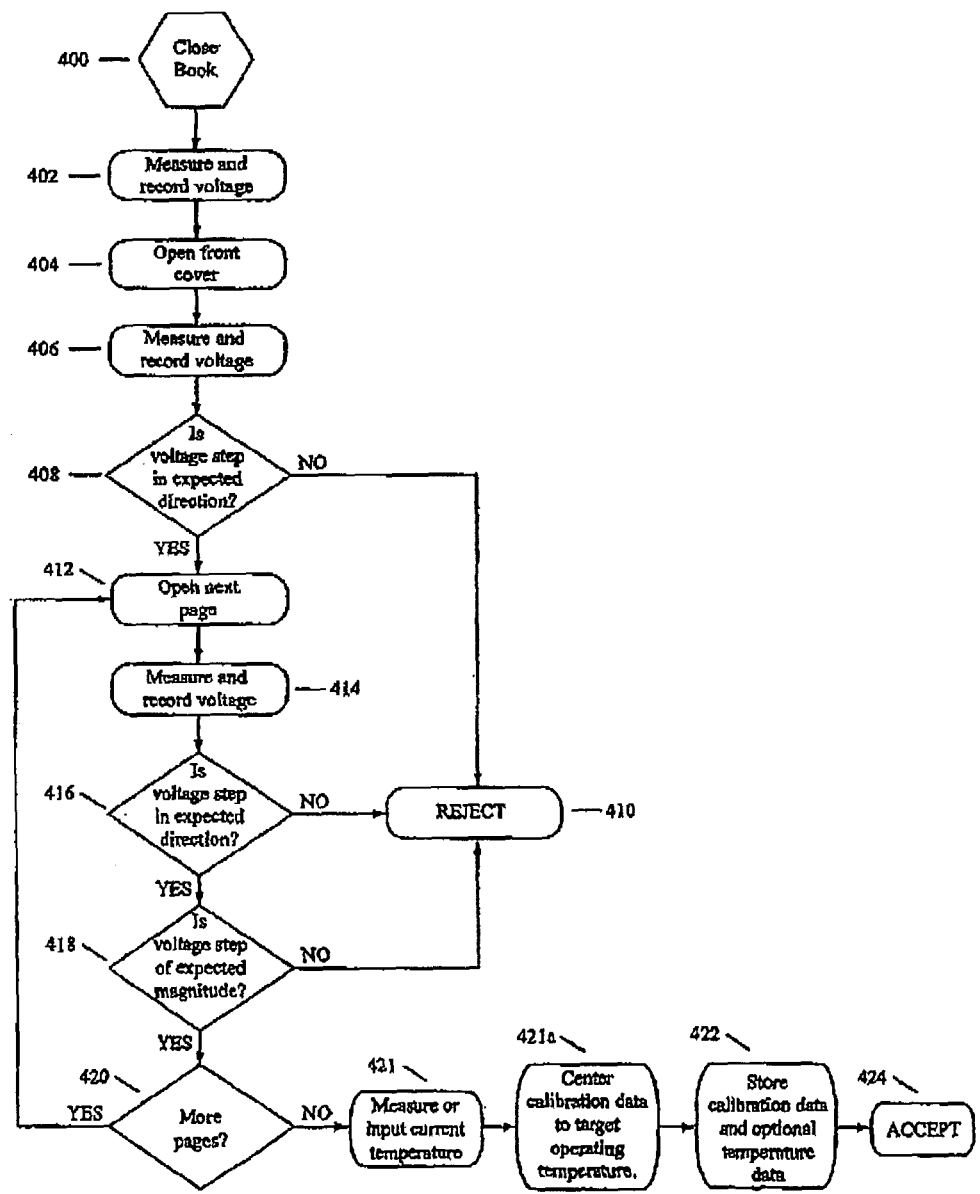
FIG. 8 shows a flow chart of a method for calibrating an interactive electronic book system with temperature compensation.
Figure 9:
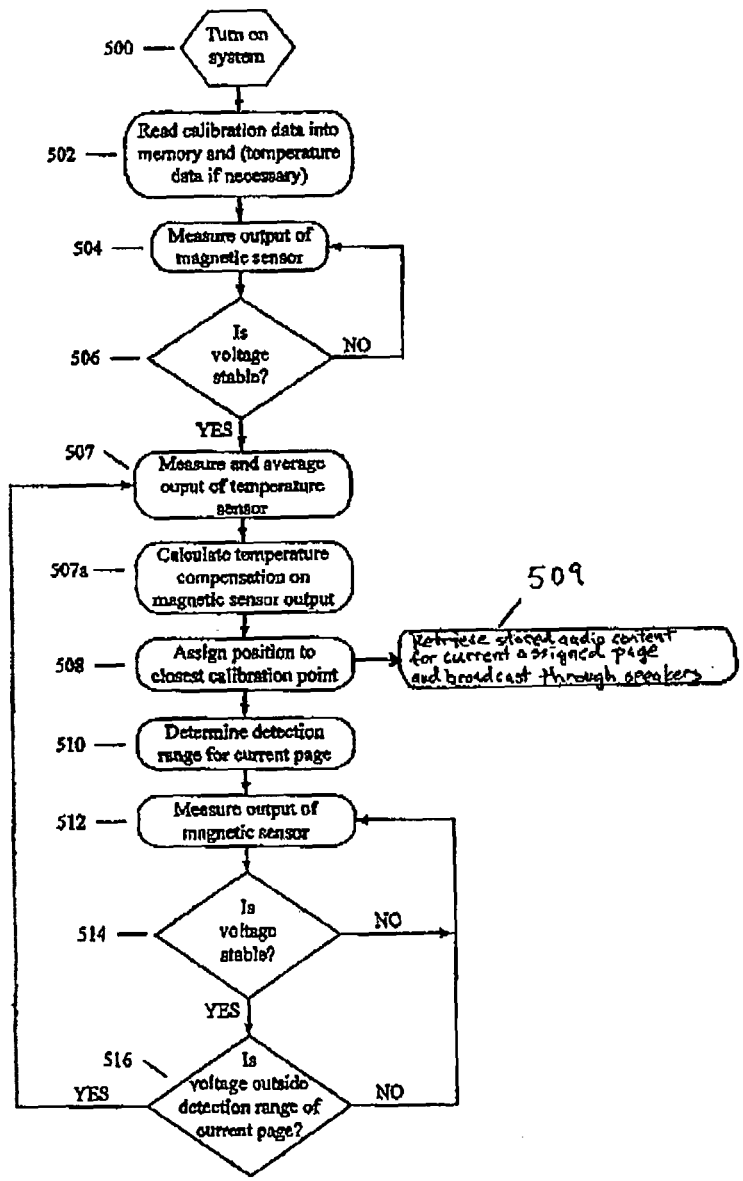
FIG. 9 shows a flow chart of a method for delivering content from an interactive electronic book system with temperature compensation.

In another alternative method for calibration, a short calibration is performed by measuring the output voltage Vout with no magnets 170 overlaying the magnetic sensor 180 (which measurement may be performed before the pages 140 are bound into the book 100), and with the book 100 closed, that is with all the pages 140 and the front cover 150 overlaying the magnetic sensor 180. The difference between these two measurements is compared with the normal range of differences for books calibrated by the full calibration procedure depicted in FIG. 5, and if the difference between the open and closed voltages is within the normal range, the book is accepted. When this short calibration procedure is used, intermediate values of the output voltage Vout of magnetic sensor 180 are computed as appropriate intervals between the fully-open and fully-closed voltage levels, based on the average results obtained from a series of books calibrated by the full calibration procedures depicted in FIG. 5 or 8.

Referring again to FIGS. 1-3, another alternative method for calibration may be applied. Repeated re-calibration may be performed after manufacture and while the electronic book system 10 is being used. This re-calibration method includes the steps of: providing an interactive electronic book system including a front cover detection means 152 and 154; closing the front cover 150; closing the front cover 150 of the book 100, measuring and recording the voltage output Vout of magnetic sensor 180; determining the difference between the stored value of the sensor voltage Vout with all pages 140 open and the newly-recorded sensor voltage Vout with all pages 140 and front cover 150 closed; calculating intermediate page voltage levels Vout by scaling the intermediate page voltage values according to the non-linear algorithm measured during the initial calibration of the book, or according to the expected intervals based on the average results obtained from a series of books calibrated by the full calibration procedure depicted in FIG. 5. Preferably front cover detection means 152 and 154 consists of a pressure-sensitive switch 154 which is activated by a tab 152 extending from the front cover 150.

When the alternative re-calibration procedure described above is employed such that the book system includes a sensor to detect when the front cover is closed and the output of the magnetic sensor system is measured each time the front cover is closed, the resulting measurement is used to adjust the calibration data and no additional temperature compensation is required. The re-calibration procedure will automatically compensate for temperature-induced changes in magnetic field strength of the fixed magnets.

As noted above and depicted in FIG. 4, the voltage change induced in the magnetic sensor by each successive identical magnet diminishes as more magnets are piled onto the sensor. This means that the voltage step for pages close to the front cover is smaller than the voltage step for pages close to the back cover. This effect may be partly overcome by using thicker or stronger magnets on pages further from the back cover. In a test, the range of voltage output was sufficient to reliably count ten pages, when magnets of thickness 0.013 inches (0.33 mm) were used for the back 7 pages, and magnets of thickness 0.015 inches (0.34 mm) were used for the front 3 pages and the front cover.

Figure 6A:
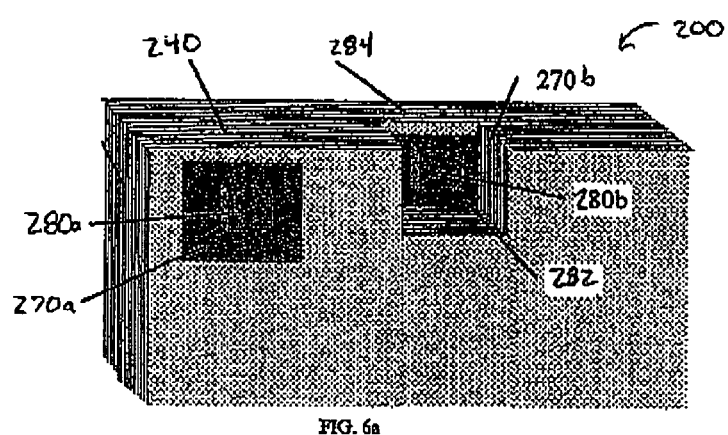
FIG. 6*a* shows in perspective view of an embodiment of an interactive electronic book system including two magnetic page sensors.
Figure 6B:
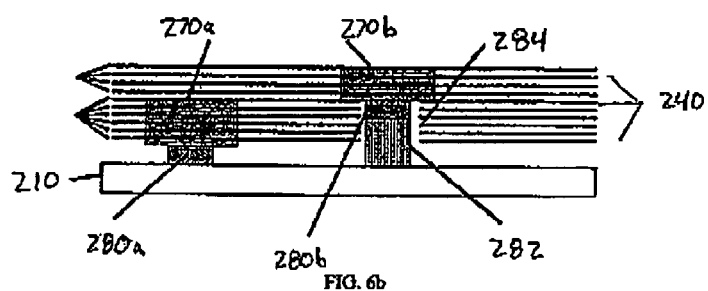
FIG. 6*b* shows a cross-sectional view of an embodiment of an interactive electronic book system including two magnetic page sensors.
Figure 7:
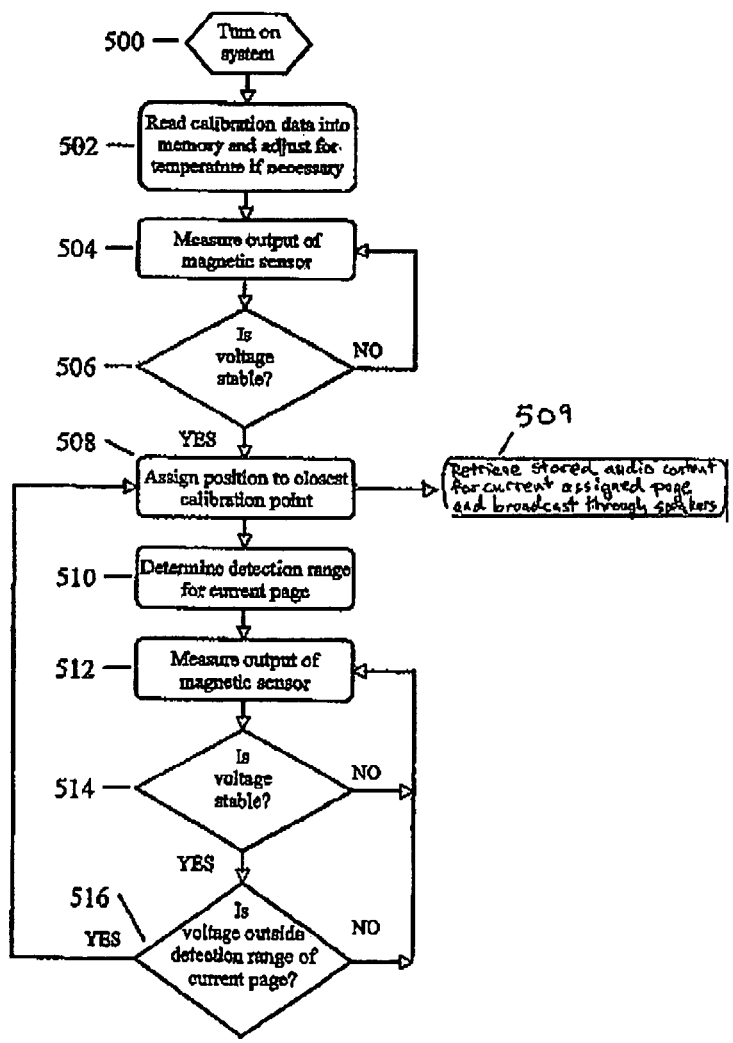
FIG. 7 shows a flow chart of a method for delivering content from an interactive electronic book system.

Referring to FIGS. 6a and 6b, a second embodiment is provided utilizing multiple magnetic sensors for a book 200 with a large numbers of pages 240. The second embodiment is similar in operation to the first embodiment described above, but incorporates a second magnetic sensor 280b to accommodate a greater number of pages 240. As the number of pages 240 increases, each successive pagination magnet 270a overlaying first magnetic sensor 280a causes a smaller magnitude step change in output voltage Vout from magnetic sensor 280a. A book 200 with more than approximately seven pages 240 may not reliably detect the most distant pages (which would correspond to the front pages of the book 200), unless stronger magnets or a more sensitive magnetic sensor are used—both potentially very costly. This page limit may be overcome by using two or more magnetic sensors.

A first magnetic sensor 280a is attached to back cover 210, aligned with a first group of pagination magnets 270a corresponding to a first group of pages 240a. A second magnetic sensor 280b is attached to back cover 210 by a spacer 282. Spacer 282 ensures magnetic sensor 280b is maintained sufficiently close to pagination magnets 270b. Cutouts 284 are provided in pages 240b to accommodate spacer 282 and second magnetic sensor 280b. First and second magnetic sensors 280a & b, respectively, are in electronic communication with a digital computer including including non-volatile memory, volatile memory, a microprocessor, an analog-to-digital converter for converting the electrical output of magnetic sensors 280a & b to a digital form, software instructions for operating the digital computer stored in the non-volatile memory, calibration data related to magnetic sensors 280a & b stored in the non-volatile memory, and audio content related to each of the plurality pages 240 of the book 200 stored in the non-volatile memory; wherein the digital computer uses the electrical output of first and second magnetic sensors 280a & b, and the calibration data to determine which of the plurality of pages 240 the book 200 is open to, and causes the speaker to play the audio content related to the open page.

Preferably, second magnetic sensor 280b is attached to the back cover at a position separated from the first magnetic sensor 280a by a distance no less than the width of pagination magnets 270a & b to prevent interference.

Referring to FIG. 7 and FIGS. 1-4, a method is provided for delivering audio content related to the pages of an interactive electronic book 10. The method comprises the steps of: providing an interactive electronic book system comprising a book including a front cover, a back cover, and a plurality of pages including visual content, wherein said front cover and each of said plurality of pages further includes a pagination magnet, each of said pagination magnets aligned with the other said magnets so as to overlay one another when said front cover and plurality of pages is closed; a magnetic sensor in close proximity to said back cover and aligned with said pagination magnets, wherein said magnetic sensor produces an electrical output related to the cumulative magnetic field from said pagination magnets overlaying said magnetic sensor; a speaker; a digital computer in electronic communication with at least said magnetic sensor, said temperature sensor, and said speaker, said digital computer including non-volatile memory, volatile memory, a microprocessor, software instructions for operating said digital computer stored in said non-volatile memory, calibration data related to said magnetic sensor and said pagination magnets stored in said non-volatile memory, and audio content related to each of said plurality pages of said book stored in said non-volatile memory.

At a step 500, the book system is activated. "Activated" as used here means to turn the system on, if the system is off, or if the system is in a standby or sleep mode to bring it back to normal operation state. At a step 502 the calibration data is read from non-volatile memory into volatile memory. If the calibration data consist only of the total voltage change from fully-closed to fully-open, the intermediate data points of the calibration table are computed at this step. Also, if temperature compensation is to be applied, it is performed at this step. At a step 504, the voltage output of the magnetic sensor is read until the voltage is stable at a step 506. Once the voltage is stable, the current page is judged at a step 508 by determining the page position calibration value that is closest to the current voltage output of the magnetic sensor. If the voltage output is equidistant from two page position calibration values, the position is judged to be the page closer to the back of the book. Once the current page position is determined, a detection range is computed at a step 510. The detection range is preferentially the range of voltage values from 60% of the voltage difference toward the next lower page position calibration point to 60% of the voltage difference toward the next higher page position calibration point. Once the detection range is determined, the voltage output of the magnetic sensor is measured at a step 512 until the voltage is stable at a step 514 and falls outside the detection range at a step 516. This determination helps prevent false changes in page detection based on minor movement of the pages. Once the voltage output is stable and falls outside the detection range, a new page position is assigned at a step 508. At a step 509 the audio content corresponding to the assigned page position is retrieved from non-volatile memory 194 and transmitted to speaker 130, causing speaker 130 to broadcast the audio content for the open page. Thereafter the process repeats until the book system is turned off. Measurement step 504 and step 512 may include a timer to determine if the voltage output does not change for an extended period of time. If a given duration is exceeded without the voltage output of the magnetic sensor having changed, the book is assumed to be unused and the book system turns itself off or to a power-conservation mode until re-activated.

Referring to FIG. 8 and FIGS. 1-4, a method of calibrating an electronic interactive book system with temperature compensation includes the steps of: providing an interactive electronic book 10 comprising a book 100 including a front cover 150, a back cover 110, and a plurality of pages 140 including visual content, wherein front cover 150 and each of the plurality of pages 140 further includes a pagination magnet 170, each of the pagination magnets 170 aligned with the other magnets 170 so as to overlay one another when front cover 150 and the plurality of pages 140 is closed; a magnetic sensor 180 in close proximity to back cover 110 and aligned with pagination magnets 170, wherein magnetic sensor 180 produces an electrical output Vout related to the cumulative magnetic field from pagination magnets 170 overlaying magnetic sensor 180; a temperature sensor 185 connected to book 100, wherein temperature sensor 185 produces an electrical output related to the ambient temperature; a speaker 130; a digital computer 190 in electronic communication with at least magnetic sensor 180, temperature sensor 185, and speaker 130, digital computer 190 including non-volatile memory 194, volatile memory 196, a microprocessor 192, software instructions for operating digital computer 190 stored in non-volatile memory 194, calibration data related to magnetic sensor 180 stored in non-volatile memory 194, temperature compensation data relating to magnetic sensor 180 and pagination magnets 170 stored in non-volatile memory 194, and audio content related to each of the plurality pages 140 of book 100 stored in non-volatile memory 194. At a step 400 the electronic book system 100 is closed. At a step 402 the output voltage Vout of magnetic sensor 180 is measured and recorded. Preferably the output voltage Vout is sampled at intervals until it is stable. In a preferred method the output voltage Vout is considered stable when three successive measurements do not vary by more than five percent (5%) in magnitude. At a step 404 the front cover 150 is opened. At a step 406 the output voltage Vout of magnetic sensor 180 is measured and recorded. Preferably the output voltage Vout is sampled at intervals until it is stable. At a step 408, the direction of the step change in output voltage Vout is evaluated—if the direction of the step change in output voltage Vout is not in the expected direction then the calibration is rejected at a step 410. In this case, starting from all pages 140 and the front cover 150 closed, the step change to output voltage Vout is expected to be negative—i.e. a decrease in the output voltage Vout. If the step change is correct, then at a step 412 the next page 140 of the electronic book system 100 is opened. At a step 414 the output voltage Vout of magnetic sensor 180 is measured and recorded. Preferably the output voltage Vout is sampled at intervals until it is stable. At a step 416, the direction of the step change in output voltage Vout is evaluated—if the direction of the step change in output voltage Vout is not in the expected direction then the calibration is rejected at a step 410. If the step change direction is correct at step 416, then at a step 418 the magnitude of the step change is compared to the expected magnitude—if the magnitude of the step change is greater or less than the expected magnitude then the calibration is rejected at a step 410. At a step 420, if there are more pages 140 to calibrate then the process repeats from step 412. If no more pages 140 remain at step 420 to be calibrated, then at a step 421 the current temperature is measured. At a step 421a the calibration data recorded in steps 400 through 420 is centered, or shifted, to a designated standard temperature by applying a temperature correction factor based on the difference in the current calibration temperature measured at step 421 and the designated standard temperature. Preferably the designated standard temperature is standard room temperature of 77° F. (25° C.). At a step 422 the centered calibration data calculated in step 421a is stored in non-volatile computer readable memory of computer 190. Preferably the calibration temperature measured at step 421 is stored in the non-volatile computer readable memory of computer 190 as well, for reference and future re-calibrations. At a step 424 the calibration is accepted.

Referring to FIG. 9 and FIGS. 1-4, a method of delivering audio content from an electronic interactive book system includes the steps of: providing a electronic interactive book system 10 comprising: a book 100 including a front cover 150, a back cover 110, and a plurality of pages 140 including visual content, wherein said front cover 150 and each of said plurality of pages 140 further includes a pagination magnet 170, each of said pagination magnets 170 aligned with the other said magnets 170 so as to overlay one another when said front cover 150 and plurality of pages 140 is closed; a magnetic sensor 180 in close proximity to said back cover 110 and aligned with said pagination magnets 170, wherein said magnetic sensor 180 produces an electrical output Vout related to the cumulative magnetic field from said pagination magnets 170 overlaying said magnetic sensor 180; a temperature sensor 185 connected to said book 100, wherein said temperature sensor 185 produces an electrical output related to the ambient temperature; a speaker 130; a digital computer 190 in electronic communication with at least said magnetic sensor 180, said temperature sensor 185, and said speaker 130, said digital computer 190 including non-volatile memory 194, volatile memory 196, a microprocessor 192, software instructions for operating said digital computer 190 stored in said non-volatile memory 194, calibration data related to said magnetic sensor 180 and said pagination magnets 170 stored in said non-volatile memory 194, temperature compensation data relating to said magnetic sensor 180 and said pagination magnets 170 stored in said non-volatile memory 194, and audio content related to each of said plurality of pages 140 of said book 100 stored in said non-volatile memory 194. The electronic book system 100 is then turned on at a step 500. If the electronic book system 10 is in a standby or sleep mode, then the system is simply activated at this step 500. The factory calibration data for the magnetic sensor 180 is then read from the computer readable non-volatile memory 194 into the computer readable volatile memory 196 of the computer 190 at a step 502. Most inexpensive non-volatile memories 194 are low pin-count devices that read and write data serially (i.e. bit-by-bit). The calibration table will most likely be stored in a device of this type and will need to be read into the volatile memory 196 of the microprocessor 192 included in the computer 190 during this step 502 before normal operation can begin. If real-time temperature compensation is to be applied, the current temperature value from temperature sensor 185 is read into the volatile memory 196 of computer 190 at this step 502. The output voltage Vout of magnetic sensor 180 is measured at a step 504. The output voltage Vout is measured at this step 504 by continuously sampling Vout at a preset time interval. If the output voltage Vout of magnetic sensor 180 is not stable at a step 506, then the output voltage Vout continues to be sampled until stable. In a preferred method, output voltage Vout is considered stable at step 506 if it does not vary by more than five percent (5%) over three samples. If the output voltage Vout of magnetic sensor 180 does not stabilize after a pre-determined number of samples then an error may be indicated and the process stopped. When the output voltage Vout of magnetic sensor 180 is stable the output value, then the output voltage of temperature sensor 185 is measured in a step 507. In a preferred method, the output voltage of temperature sensor 185 is sampled several times and the average output is used. The temperature compensation is calculated and applied to the voltage output Vout of magnetic sensor 180 in a step 507a. In a preferred method, the output voltage Vout of magnetic sensor 180 is adjusted using a gain-offset calculation that includes the current temperature value and the value from the factory calibration. As an example, in an embodiment the magnets 170 are 0.013 inch (0.33 mm) thick rubber magnets which will experience a decrease in magnetic field strength of up to three percent (3%) for a temperature rise of 20° F. (11° C.), which would correspond to a gain-offset of 0.97 for a 20° F. difference between the local temperature and the factory calibration temperature. This scales the current magnetic sensor output voltage Vout for the temperature at which the calibration table was generated. The temperature-adjusted output value of magnetic sensor 180 is then compared to the calibration table data at a step 508 and assigned the page number with a stored calibration table value closest to the temperature-adjusted value at a step 508. At a step 510, the detection range for the current page is determined. If the magnetic sensor output goes outside of the detection range determined in this step 510 then this indicates that a page has been turned. Preferably, the detection range is approximately 60% of the interval between the next higher and the next lower page values in the calibration table to ensure reliable detection of page turning in the presence of electrical noise in the system. The Applicant has found that 60% produced consistently reliable results through experimentation even with relatively low signal-to-noise ratios. The Applicant has found that an a detection range of less than 50% reduces reliability, but smaller detection range ratios might be used if the signal-to-noise ratio is improved. The goal is to introduce hysteresis that prevents the page number from changing due to system noise. The output voltage Vout of magnetic sensor 180 is measured at a step 512. The output voltage Vout is measured at this step 512 by continuously sampling Vout at the previously described preset time interval in step 506. If the output voltage Vout of magnetic sensor 180 is not stable at a step 514, then the output voltage Vout continues to be sampled until stable. In a preferred method, output voltage Vout is considered stable at step 514 if it does not vary by more than five percent (5%) over three samples. If the output voltage Vout of magnetic sensor 180 does not stabilize after a pre-determined number of samples then an error may be indicated and the process stopped. At a step 516 the stable output voltage Vout of magnetic sensor 180 is compared to the detection range of the current page determined in step 510. When the output voltage Vout is determined to be outside the detection range established in step 510 then the page 140 has been changed, and the process returns to step 507 to determine which page 140 is now open. The process will continue in this manner until the electronic book system 100 is turned off or otherwise deactivated, such as by entering a standby or sleep mode. Preferably a time out process is included, such that if no change occurs in output voltage Vout of magnetic sensor 180 sufficient to indicate a changed page, then the electronic book system 100 goes into a standby or sleep mode, or turns off, in order to conserve power.

Those skilled in the art will recognize that numerous modifications and changes may be made to the preferred embodiment without departing from the scope of the claimed invention. It will, of course, be understood that modifications of the invention, in its various aspects, will be apparent to those skilled in the art, some being apparent only after study, others being matters of routine mechanical, chemical and electronic design. No single feature, function or property of the preferred embodiment is essential. Other embodiments are possible, their specific designs depending upon the particular application. As such, the scope of the invention should not be limited by the particular embodiments herein described but should be defined only by the appended claims and equivalents thereof.

We claim:

1. An interactive electronic book system, comprising:
a book including a front cover, a back cover, and a plurality of pages including visual content, wherein said front cover and each of said plurality of pages further includes a pagination magnet, each of said pagination magnets aligned with the other said pagination magnets so as to overlay one another when said front cover and said plurality of pages are closed;
a magnetic sensor in close proximity to said back cover and aligned with said pagination magnets, said magnetic sensor configured to produce magnetic sensor electrical output related to a cumulative magnetic field from said pagination magnets detected by said magnetic sensor;
a temperature sensor connected to said book, said temperature sensor configured to produce temperature sensor electrical output related to ambient temperature;
a speaker;
a digital computer in electronic communication with at least said magnetic sensor and said speaker, said digital computer including a non-volatile memory, volatile memory, a microprocessor, an analog-to-digital converter for converting said magnetic sensor electrical output to a digital form, software instructions for operating said digital computer stored in said non-volatile memory, calibration data related to said magnetic sensor stored in said non-volatile memory, temperature compensation data relating to said magnetic sensor and said pagination magnets stored in said non-volatile memory, and audio content related to each of said plurality pages of said book stored in said non-volatile memory; and
said digital computer configured to use said magnetic sensor electrical output, said temperature sensor electrical output, said temperature compensation data, and said calibration data to determine which of said plurality of pages of said book is open to, and configured to cause said speaker to play said audio content related to said open page.

2. The interactive electronic book system of claim 1, wherein said temperature sensor is a thermistor.

3. The interactive electronic book system of claim 1 further comprising:
front cover sensing means for sensing when said front cover of said book is closed independently of said magnetic sensor, said front cover sensing means in electronic communication with said digital computer.

4. The interactive electronic book system of claim 1 further comprising a front cover magnetic sensor and a permanent magnet attached to said front cover so as to overlay said front cover magnetic sensor.

5. A method of calibrating an interactive electronic book utilizing magnetic page detection, comprising the steps of:
providing a book with a cover and a plurality of pages each with a pagination magnet, the cover including a magnetic sensor, the book configured so that when the book is closed, each of said pagination magnets aligns with the other said pagination magnets so as to overlay one another and the magnetic sensor;
opening said book to a first page of a plurality of pages; measuring as part of calibration data an output of said magnetic sensor with said book open to said first page, the output based on a cumulative magnetic field generated by the pagination magnets of the plurality of pages;
turning from a previous page to a next page of said plurality of pages;

measuring as part of the calibration data an output of said magnetic sensor with said next page open, the output based on a cumulative magnetic field generated by the pagination magnets;

determining if a change in the output of said magnetic sensor from the previous page to the next page is in an expected direction, and if not, then terminating the calibrating;

determining if a magnitude of the change in the output of said magnetic sensor from the previous page to the next page is in an expected range, and if not, then terminating the calibrating;

measuring an ambient temperature around the book at a time of measuring the calibration data;

centering the calibration data based on the ambient temperature and a temperature correction factor; and storing the centered calibration data in a non-volatile memory in the book.

6. An interactive electronic book, comprising:

a plurality of pages and at least one cover;

a plurality of pagination magnets, wherein a pagination magnet is deposed in each of the plurality of pages and the at least one cover so as to overlay one another when the book is closed;

a magnetic sensor aligned with the plurality of pagination magnets, the magnetic sensor configured to produce a magnetic sensor electrical output related to a cumulative magnetic field of pagination magnets that are detected by the magnetic sensor;

a temperature sensor configured to produce temperature sensor electrical output;

a non-volatile memory storing temperature compensation data relating to the magnetic sensor and the pagination magnets, calibration data related to the magnetic sensor and audio content related to each of the plurality of pages;

a speaker; and a processor comprising a component for converting the magnetic sensor electrical output into a digital form, wherein the processor is configured to use the magnetic sensor electrical output, temperature sensor electrical output, the temperature compensation data, and the calibration data to determine which of the plurality of pages the book is open, and configured to cause the speaker to play a portion of audio content related to the page which is open.

* * * * *